(12) United States Patent
Nunez et al.

(10) Patent No.: US 8,059,026 B1
(45) Date of Patent: Nov. 15, 2011

(54) INTERFERENCE AVOIDING TRANSFORM DOMAIN RADAR

(75) Inventors: Abel S. Nunez, Fairborn, OH (US); James T. Caldwell, Kettering, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 258 days.

(21) Appl. No.: 11/365,247

(22) Filed: Mar. 1, 2006

(51) Int. Cl.
*G01S 13/00* (2006.01)

(52) U.S. Cl. .......................... 342/159; 342/84; 375/146

(58) Field of Classification Search .............. 342/82, 342/83, 84, 157, 159; 375/146
See application file for complete search history.

(56) References Cited

U.S. PATENT DOCUMENTS

| | | | |
|---|---|---|---|
| 5,029,184 A | | 7/1991 | Andren et al. |
| 5,280,288 A | * | 1/1994 | Sherry et al. ..................... 342/83 |
| 5,450,456 A | | 9/1995 | Mueller |
| 5,557,637 A | | 9/1996 | Glynn |
| 5,686,922 A | | 11/1997 | Stankwitz et al. |
| 5,745,484 A | | 4/1998 | Scott |
| 6,363,107 B1 | | 3/2002 | Scott |
| 6,377,206 B1 | | 4/2002 | Petty |
| 6,426,977 B1 | | 7/2002 | Lee et al. |
| 6,469,662 B2 | * | 10/2002 | Tullsson ........................ 342/195 |
| 6,518,917 B1 | * | 2/2003 | Durfee et al. .................. 342/160 |
| 6,873,744 B2 | | 3/2005 | Otteson |
| 2006/0198472 A1 | * | 9/2006 | Nakamura et al. ............. 375/343 |
| 2007/0211786 A1 | * | 9/2007 | Shattil ............................ 375/141 |

OTHER PUBLICATIONS

V. Chakravarthy et al., "TDSC, OFDM, and MC-CDMA, a Brief Tutorial", IEEE Radio Communications, Sep. 2005, p. S11.

* cited by examiner

*Primary Examiner* — Isam Alsomiri
(74) *Attorney, Agent, or Firm* — AFMCLO/JAZ; Gerald B. Hollins

(57) ABSTRACT

An ultra-wideband pulse Doppler radar employing a transform domain communication system class of output waveform, a waveform additionally modified for enhanced radar usage. The achieved waveform includes sequential radar output pulse discrimination, improved pulse repetition frequency range ambiguity, phase modulation generating a noise-like output signal appearance and improved resolution characteristics. The invention employs radar waveform shaping in the frequency domain according to a sample of present operating band interference conditions followed by transformation into the time domain for fabricating an output pulse waveform. Mathematical basis for the improved output waveform and correlation comparisons in graphical form are included in the disclosure.

14 Claims, 5 Drawing Sheets

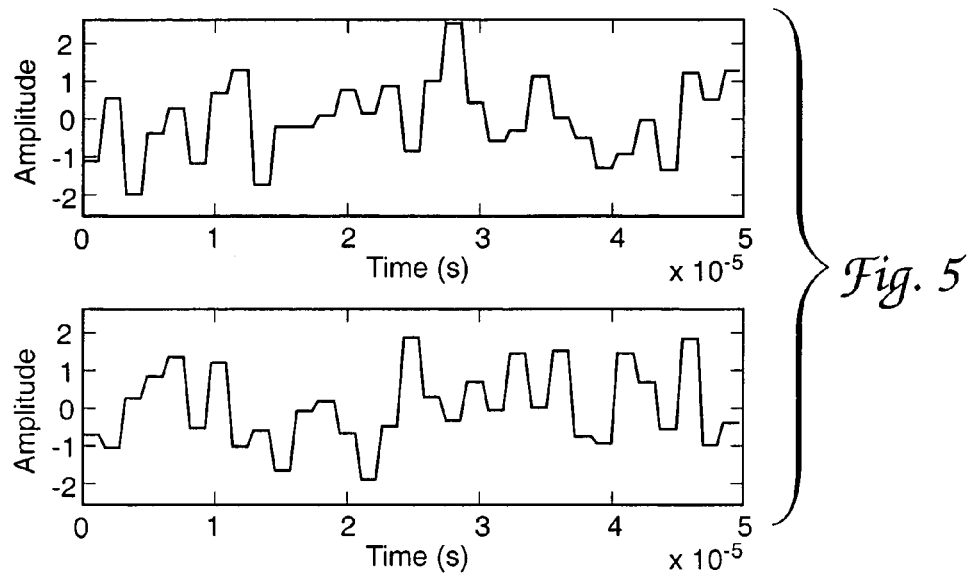
*Fig. 5*
*Fig. 6*
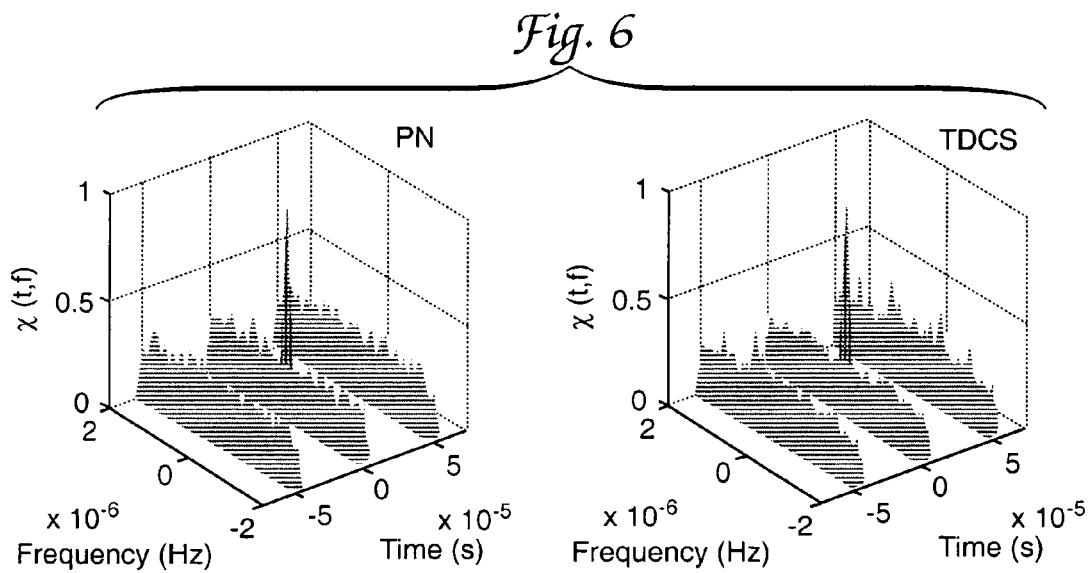

INTERFERENCE AVOIDING TRANSFORM DOMAIN RADAR

RIGHTS OF THE GOVERNMENT

The invention described herein may be manufactured and used by or for the Government of the United States for all governmental purposes without the payment of any royalty.

BACKGROUND OF THE INVENTION

The transform domain communication system (TDCS) is known to generate a transmitter output signal inclusive of component frequencies previously determined to be free of interfering signals i.e., to fabricate a communicated pulse waveform using exclusively unoccupied component frequencies, or frequencies occupied only by low level weak signals. This selection of preferred component signals for an output signal is of course achieved through a preliminary examination of the band of operation used by the communication system followed by selection of the generated and communicated pulse signal components to lie within the unused band portions encountered during this examination. A communication system operating in this manner is disclosed for example in U.S. Pat. No. 5,029,184 issued to Carl F. Andren et al. in 1991; such systems are also described in the Institute of Electrical and Electronic Engineers technical journal article "TDCS, OFDM, and MC-CDMA, a Brief Tutorial" authored by Vasu Chakravarthy, Abel S. Nunez and James P. Stephens, and appearing in IEEE Radio Communications, September 2005 page S11. Each of these identified documents is hereby incorporated by reference herein.

After some investigation we find that it can be advantageous to employ signals of the type described in these documents, transform domain communication system-like signals in the realm of radar. Such radar may, for example, be attended by the sleuth and militarily desirable properties achieved with the communication application of this fabricated interference-free signal. Notably in employing these previously communications art signals for the distinctly different radar purpose it is desirable to employ signal simplifications and also to make certain added improvements in the nature of the signals when they are used for radar purposes. Information concerning these topics is disclosed in the following description.

SUMMARY OF THE INVENTION

The present invention provides a significantly improved ultra-wideband pulse Doppler radar.

It is therefore an object of the present invention to provide an ultra-wideband pulse Doppler radar having enhanced and advantageous specific signal characteristics.

It is thus an object of the present invention to increase the maximum unambiguous range in an ultra-wideband pulse Doppler radar.

It is another object of the present invention to provide an ultra-wideband pulse Doppler radar having improved radiated power on target characteristics.

It is another object of the invention to provide an ultra-wideband pulse Doppler radar in which the transmitted radar signal can be easily surmised by an opponent to be a burst of ambient noise rather than a quantum of usable radio frequency signal.

It is another object of the invention to provide the combination of enhanced bandwidth and enhanced power on target characteristics in an ultra-wideband pulse Doppler radar.

It is another object of the invention to provide the combination of enhanced bandwidth, enhanced power on target and increased maximum unambiguous range characteristics in an ultra-wideband pulse Doppler radar.

It is another object of the invention to provide the combination of high pulse repetition frequency and large unambiguous range in a pulse Doppler radar.

It is another object of the invention to provide increased maximum unambiguous range in an ultra-wideband pulse Doppler radar through use of a signal modulating pulse spreading code.

It is another object of the invention to provide increased maximum unambiguous range in an ultra-wideband pulse Doppler radar through use of orthogonally coded radar pulse signal waveforms.

It is another object of the invention to provide an ultra-wideband pulse Doppler radar having improved radar pulse autocorrelation capability.

It is another object of the invention to enhance the bandwidth of an ultra-wideband pulse Doppler radar in a manner approaching the characteristics of Gaussian noise or a pseudo-noise sequence.

It is another object of the invention to provide an ultra-wideband pulse Doppler radar having a maximum operating range extending to the horizon.

It is another object of the invention to provide an ultra-wideband radar having improved ability to identify small slow-moving targets located near main beam clutter sites.

It is another object of the invention to provide a ultra-wideband pulse Doppler radar having high interference signal immunity capability.

It is another object of the invention to provide a ultra-wideband pulse Doppler radar enjoying the interfering signal immunity and other advantages found in a transform domain communication system.

These and other objects of the invention will become apparent as the description of the representative embodiments proceeds.

These and other objects of the invention are achieved by the method of operating an ultra-wideband transform domain pulse Doppler radar comprising the steps of:

selecting unused spectral regions within an operating frequency band of said radar for present usage thereby;

identifying a plurality of evenly spaced specific frequencies within each of said unused spectral regions;

generating a radar transmitter output signal component at each of said evenly spaced identified unused specific frequencies;

altering phase relationships between said specific frequency signals according to a predetermined phasing algorithm; and combining said phase altered specific frequency signals into a composite transmitter output signal of said radar.

BRIEF DESCRIPTION OF THE DRAWINGS

The accompanying drawings incorporated in and forming a part of the specification, illustrate several aspects of the present invention and together with the description serve to explain the principles of the invention. In the drawings:

FIG. 5 shows representative transform domain communication system sequences usable for radar bandwidth enhancement in the present invention.

FIG. 6 shows a comparison of pseudo-noise and transform domain communication system ambiguity surface diagrams relevant to the present invention.

DETAILED DESCRIPTION

Radar Fundamentals

Figure 1:
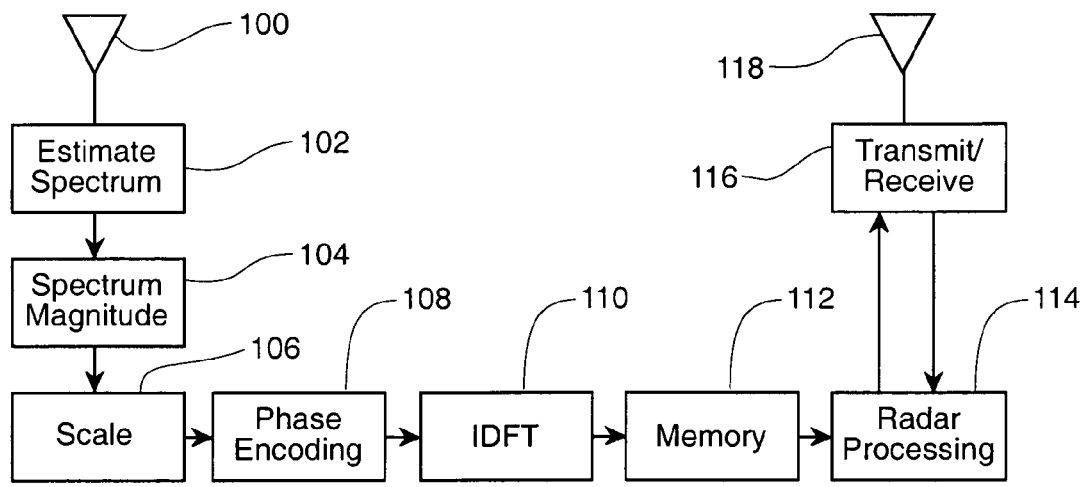
FIG. 1 shows a signal flow diagram for a radar apparatus according to the present invention.

Traditionally, ultra-wideband radars increase signal bandwidth by using shorter transmitter pulses. However, by decreasing the transmitter pulse width, the radiated power on target decreases and radar detection probabilities consequently decrease. Therefore, new approaches to increase bandwidth are desirable while achieving adequate power on target. One new approach to achieve this involves using a Transform Domain Communication System (TDCS) selectively fabricated waveform as an ultra-wideband radar waveform. A primary advantage achieved from this technique is that the resulting waveform provides properties similar to that of Gaussian noise meaning that the radar achieves improved bandwidth similar to that of a pseudo-noise (PN) sequence waveform. The present invention is believed to provide notable improvements in this area.

Also, in view of the number of carriers or component frequencies used to generate the transform domain communication system code used for such a radar, the achieved multiple radar pulses output of such a transmitter can be made mutually orthogonal or uniquely identifiable in nature. Such orthogonality can be exploited to effectively increase the maximum unambiguous range for a pulse-Doppler radar up to the range of the horizon for example. In essence, such a transform domain communication system waveform radar may therefore possess a desirable combination of high pulse repetition frequency (PRF) for more accurate velocity estimation and larger unambiguous range for greater distant target identification. The present invention also provides this improvement to the radar art.

In addition, the requirements for radar detection and identification of smaller, slow-moving targets residing near main beam clutter call for other radar improvements. Conventional narrowband radars use Doppler filtering to separate target from interference in the frequency domain—where they can be separated using the Doppler shift effect. Another method of improving the detection and identification of these smaller, slow-moving clutter obscured targets involves increasing the bandwidth of the radar apparatus to improve range resolution and inter-clutter visibility. The present invention also addresses this area of improvement to the radar art.

Concerning this bandwidth, the ways to effectively increase radar resolution involve complex adaptive processing or decreasing the emitted pulse width.[1-14] (Exponential numbers such as these identify reference publications listed at the end of this specification. The contents of these publications are hereby incorporated by reference herein.) Reducing radar pulse width increases the bandwidth because bandwidth is inversely proportional to the pulse width, i.e., mathematically bandwidth is one over the pulse width.[14] However, reducing the pulse width diminishes the power on target as noted above herein and this puts a stringent peak power demand on the radar signal generating hardware.

One method of increasing radar bandwidth that does not however reduce pulse width is to multiply the generated radar pulse by a spreading code. This has the effect of increasing bandwidth without the problems associated with reducing the pulse width. Traditionally, radars use Barker Codes for the purpose of increasing the bandwidth while keeping the pulse width constant. Unfortunately Barker Codes only have a maximum length of 13. The length of the pulse compression code used is often referred to as the Pulse Compression Ratio (PCR) which is also the amount of bandwidth improvement. Using a Barker Code is desirable because of its desirable auto-correlation properties,[14] but with a maximum pulse compression ratio of only 13, bandwidth may not be increased enough for a desirable High Range Resolution (HRR) radar. Another common method used to increase this bandwidth is through use of pseudo-noise PN) sequence codes, codes which can be of any length 2n−1 where n is a positive integer.[15] The present invention also provides benefits in this area.

Another fundamental radar parameter influencing target detection capability is the Pulse Repetition Frequency (PRF) used in the radar. The pulse repetition frequency determines the maximum unambiguous range and the maximum Doppler unambiguous value of the radar. The Doppler frequency value is also used to estimate potential target velocities. For example, low pulse repetition frequency radars have a very large unambiguous range but a very low unambiguous Doppler frequency value. This means low pulse repetition frequency radars can very accurately estimate potential target ranges but not their velocities. Conversely, high pulse repetition frequency radars have a small unambiguous range but a very high Doppler unambiguous frequency value. High pulse repetition frequency radars commonly are used to estimate target velocities accurately.

The Doppler frequency return observed by a radar system is shown mathematically in equation 1, where λ is the wavelength and $v_r$ is the relative velocity between the radar and the target.[16]

$$f_d = \frac{2v_r}{\lambda} \quad (1)$$

However, the maximum unambiguous Doppler frequency value is equal to the pulse repetition frequency.[17] Doppler frequencies greater than the pulse repetition frequency alias in a similar way that sampled frequencies alias according to the Nyquist Theorem. The Nyquist Theorem states that the maximum unambiguous frequency that can be measured is less than or equal to half the sample rate. The maximum velocity estimate can be obtained by substituting $f_r$ for $f_d$ in equation 1 and solving for $v_r$ as shown in equation 2, where $f_r$ is the PRF.

$$v_r = \frac{f_r \lambda}{2} \quad (2)$$

Unfortunately, radars cannot arbitrarily increase the pulse repetition frequency or there will not be adequate unambiguous range information according to the following relationship shown in equation 3 where c is the speed of light.[14]

$$R_u = \frac{c}{2f_r} \quad (3)$$

Doppler radars usually only need to have range information extending out to the range of the horizon which is calculated with equation 4 where h is the altitude of the radar and $a_e$ is the effective radius of the earth ($8.495 \times 10^6$ meters).[4]

$$R_h = \sqrt{h^2 + 2ha_e} \quad (4)$$

When $R_u$ is less than $R_h$, then there are range ambiguities that fold over onto each other and the radar does not know absolutely which range cell a target may lie in. It may thus be appreciated that a radar apparatus having both a high pulse repetition frequency for velocity estimation and a large unambiguous range for range estimation is desirable.

The Transform Domain Communication System

One purpose of a transform domain communication system is to communicate in a radio frequency (RF) environment containing extensive interference. Normally, communication systems attempt to mitigate interference effects by employing sophisticated filtering techniques in the time and/or frequency domains. A transform domain communication system effectively samples the RF environment and generates "smart" waveforms at the transmitter; "smart" here simply implies the transmitted waveforms contain no (or minimal) energy in spectral areas containing interference.[18] Such waveforms may have essentially any pulse repetition frequency and pulse configuration desired notwithstanding the unavailability of component signals at some occupied frequencies because "smart" waveforms do not reside in occupied frequencies. For present invention purposes we assume there is no interference present on the selected component frequencies, later improvements to the present invention may disclose interference considerations. In the present invention moreover transform domain communication system waveforms may be appreciated to add bandwidth improvements to the radar apparatus disclosed.

A transform domain communication system waveform is essentially a sum of sinusoidal components. The frequency of each sinusoidal component is an integer multiple of the inverse of the achieved pulse width. Herein a spreading phase component is generated for each sinusoid using a pseudo-noise sequence where for example, one of four possible phase displacements can be generated, displacements of 0, π/2, π, or 3π/2 radians. Having four different possible spreading phases for each of the sinusoids improves the autocorrelation properties of the resultant waveforms. The achieved displaced waveform is then sampled at an integer multiple of the inverse of the pulse width and a rate which is more than twice the highest frequency of the sinusoids sample. Equation (5) below shows a mathematical representation for one pulse in an output sequence for a present invention radar, equation (6) below shows a second and final pulse in a presently considered two pulse sequence.

$$s_1(n) = \frac{2}{N}\sum_{p=1}^{P} A_p \cos\left(2\pi p \frac{n}{N} + \phi_p\right) \; 0 \le n \le N-1, \; P < \frac{N}{2} \quad (5)$$

Once the first pulse code is defined a second pulse code can be defined which is orthogonal to and easily distinguished from the first code when they are synchronized. This code is shown in equation (6). This code has an additional phase parameter □p, which generates the desired orthogonality. For this description the spreading phase, □p, was generated using a pseudo-noise sequence where it can take on the phase value of either π/2 or −π/2. Although pulses $s_1$ and $s_2$ would be orthogonal when synchronized by assigning each spreading phase a simple value of π/2, assigning the positive and negative angle spreading phase values of π/2 and −π/2 through the pseudo-noise sequence improves the cross correlation properties of the pulses.

$$s_2(n) = \frac{2}{N}\sum_{p=1}^{P} A_p \cos\left(2\pi p \frac{n}{N} + \phi_p + \theta_p\right) \; 0 \le n \le N-1, \; P < \frac{N}{2} \quad (6)$$

With respect to the present invention it is notable that a conventional transform domain communication system signal, when used for its intended purpose, is often provided with a coded information component used in the signal receiver circuit to identify an appropriate signal decoding algorithm for use in receiving the signal. The absence of need for this decoding algorithm identification component in the present radar application of this type of signal is a notable simplification of the present invention signals over their communication signal counterparts. In the radar signal instance it is of course possible to communicate the transmitted radar signal and its characteristics directly to the receiver of the radar system since transmitter and receiver may be co-located in a radar system.

A Transform Domain Communication System Radar

Figure 2:
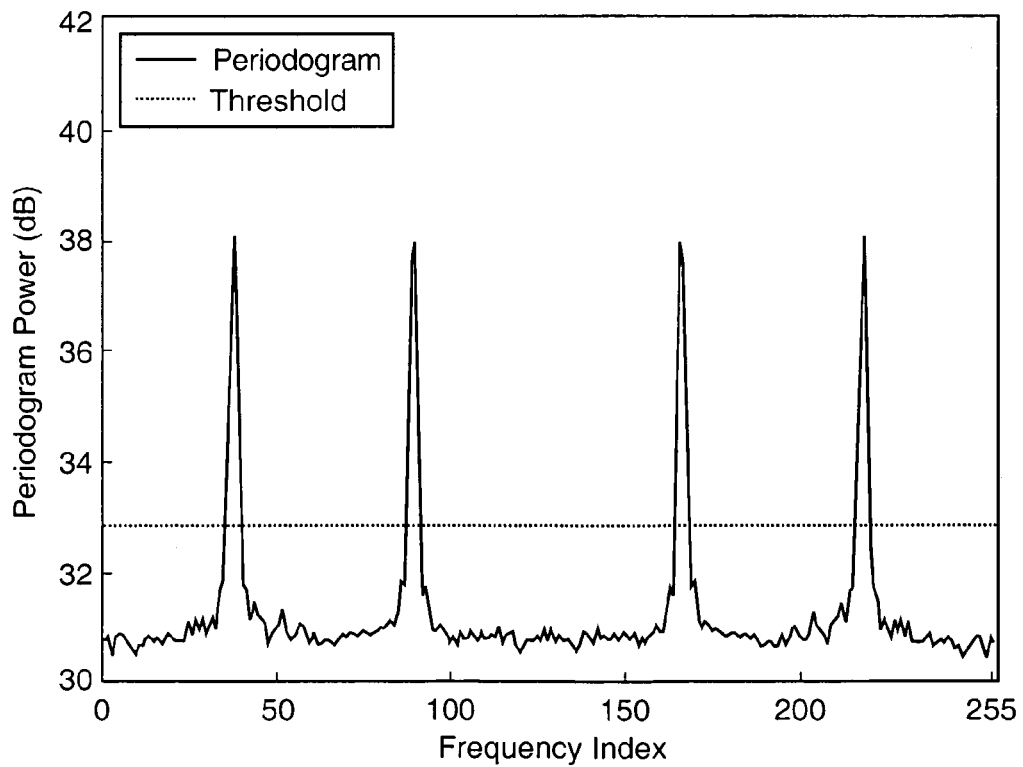
FIG. 2 shows a representative interfering signal environment for a radar apparatus according to the present invention.
Figure 3:
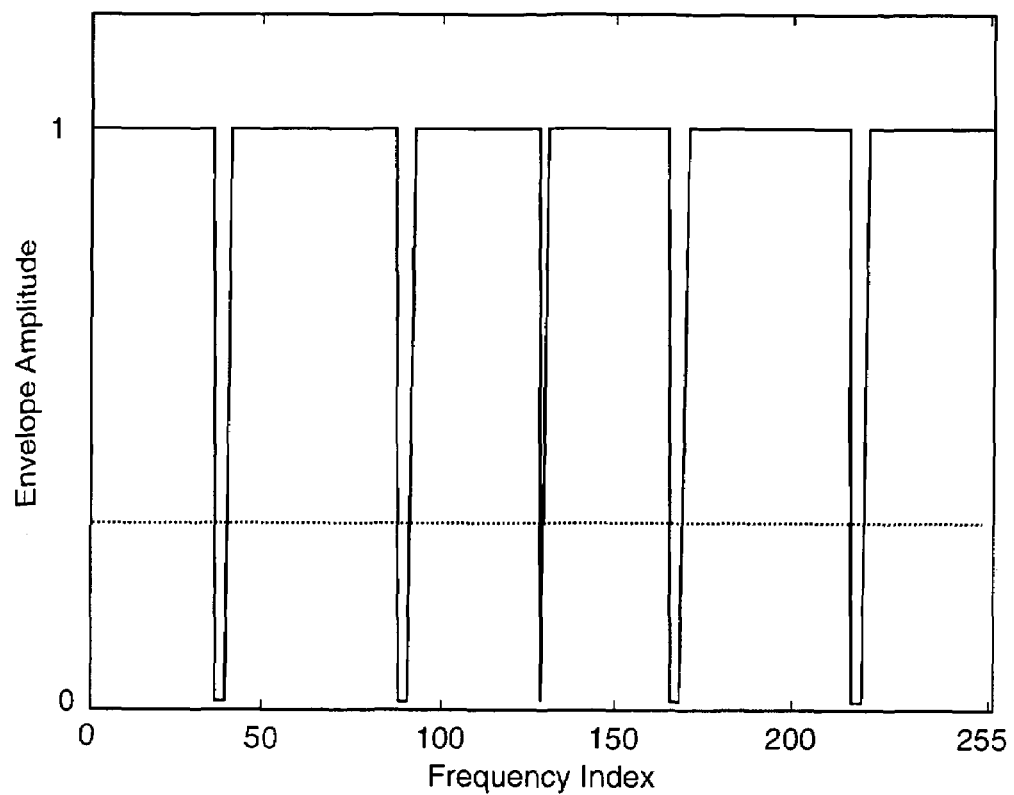
FIG. 3 shows a radar signal spectrum based on the FIG. 2 signal environment.

FIG. 1 in the drawings shows a block diagram for a transform domain communication system waveform Ultra-Wideband Radar according to these discussed concepts. In the FIG. 1 drawing the first step at 102 involves sampling the electromagnetic environment found by the receiving antenna 100. This sampling defines a spectral magnitude estimate based on an auto-regressive filter or a periodogram representation of the possible radar environment. FIG. 2 in the drawings shows an example of such a periodogram involving two interference signal transmitters of different frequency output (Note this figure shows a two-sided spectrum). A decision threshold is generated in the step 104 in the FIG. 1 drawing; this threshold is based on the noise floor of the sampled radio frequency environment. Spectral components of signals that cross this threshold are "notched" out of the spectrum of the fabricated radar waveform. The drawing of FIG. 3 shows the spectrum of the desired radar waveform based on the sample environment experienced in FIG. 2.

The next step in the FIG. 1 process is to scale the spectral components of the desired radar waveform so that no matter how many spectral components are remaining after the threshold process, the radar waveform has a fixed amount of energy. This scaling is represented by the block 106 in the FIG. 1 drawing. The more spectral components removed from the radar waveform in the scaling step, the greater the energy level or the power assigned to the remaining spectral components. The next step in the process is to encode the spectral components of the radar waveform with a set of phases; this step is represented at 108 in the FIG. 1 diagram. This encoding involves the phase concepts described above herein. This phase encoding of the spectral components serves two purposes. It reduces the peak power of the radar waveform over its pulse width because the Waveforms add deconstructively. The phase encoding also provides security by making the encoded radar waveform appear noise-like to an enemy observer.

At 110 in the FIG. 1 drawing the phase encoded radar pulses are subjected to an inverse Fourier transformation processing, this processing takes the signal back into the time domain allowing the radar to transmit the waveform in real time.

The radar processed pulses from the block 114 step in FIG. 1 are used to control the transmitter and receiver of the radar apparatus as is represented at 116 in the FIG. 1 drawing. Illumination of and collection of reflected pulses from radar targets located remotely from the FIG. 1 apparatus occurs by way of the radar antenna shown at 118 in the FIG. 1 drawing.

In Table 1, as shown below herein, radar results comparing an uncoded radar with a pseudo-noise coded radar and a transform domain communication system coded radar are shown.

added bonus, it also increases the system bandwidth to enable better range resolution. The following example demonstrates the improvements obtained by using the transform domain communication system waveform.

An uncoded radar with a pulse repetition frequency of 2 kHz operating under the conditions specified in the above topic "Simulation Parameters" has an unambiguous range of 75 kilometers, a maximum unambiguous velocity estimate of 33.33 meters/second, and a bandwidth of 20 kilohertz. However, the range to the horizon is 300 kilometers so that there are three range ambiguous returns for each unambiguous range. To increase the unambiguous range out to the horizon, the radar pulse repetition frequency might be decreased to 0.5 kilohertz but the maximum velocity estimate decreases to 8.33 meters/second in such instance.

In comparison a present invention transform domain communication system waveform system operating under these conditions has an unambiguous range of 150 kilometers and this is achieved by using two orthogonal transmitter pulses and two matched receiver filters. Additionally, the effective bandwidth is nevertheless improved by a factor of the pulse compression ratio times the original bandwidth where the pulse compression ratio is 31 for this example. To see out to the horizon with this system, the pulse repetition frequency

TABLE 1

| Radar Type | Uncoded | Uncoded Extended Range | PN | PN Extended Range | TDCS | TDCS Extended Range |
|---|---|---|---|---|---|---|
| frequency (GHz) | 9 | 9 | 9 | 9 | 9 | 9 |
| PRF (kHz) | 2 | 0.5 | 2 | 0.5 | 2 | 1 |
| $R_u$ (km) | 75 | 300 | 75 | 300 | 150 | 300 |
| Max $v_r$ estimate (m/s) | 33.33 | 8.33 | 33.33 | 8.33 | 33.33 | 16.66 |
| Bandwidth (kHz) | 20 | 20 | 620 | 620 | 620 | 620 |
| Altitude (km) | 5 | 5 | 5 | 5 | 5 | 5 |
| $R_h$ (km) | 300 | 300 | 300 | 300 | 300 | 300 |

Simulation Parameters

Figure 4:
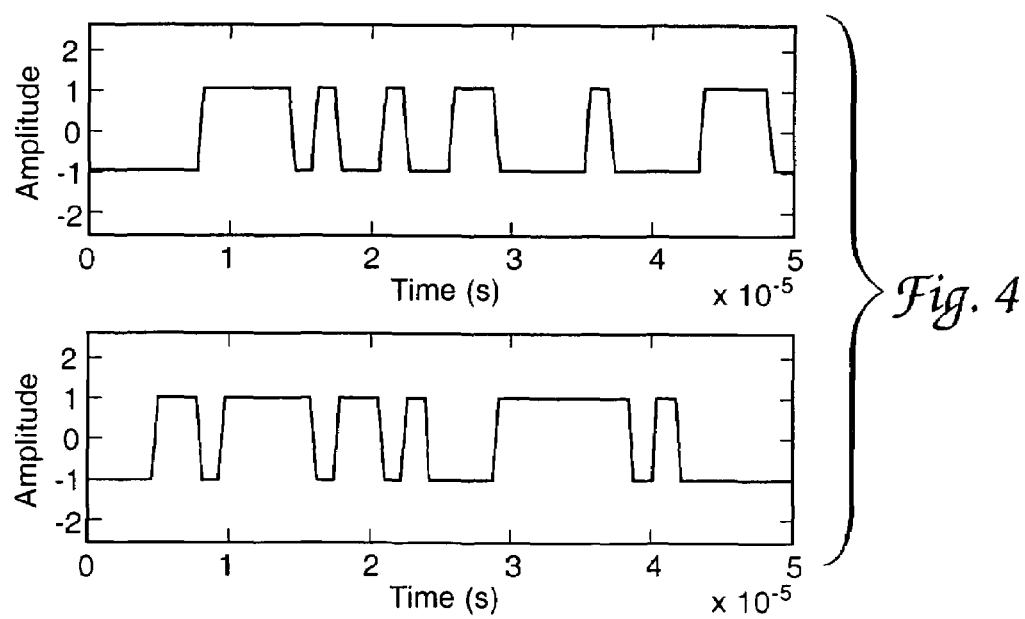
FIG. 4 shows representative pseudo noise pulse sequences usable for radar bandwidth enhancement purposes.

In order to better appreciate improvements achieved by a radar apparatus made according to the present invention a simulation process may be used. This simulation can be based on an actual 50 microsecond pulse width X-band system having an operating frequency of 9 GHz. and located in an aircraft of 5 kilometer altitude with a range to the horizon of 300% kilometers; a system of this nature is described in reference 14 identified in the appendix of this document. For the pseudo-noise sequence modeled, two different maximal length sequences of 31 length may be generated. These codes are used to increase the bandwidth of the radar pulse. FIG. 4 in the drawings shows the two pseudo-noise sequences used in graphical form. The FIG. 4 transform domain communication system codes can be generated from equation 5 and 6 above herein. For these codes P=15, $A_p$=1, and N=31. A maximal sequence of 31 length may be used to generate 15 sets of two bits. Each set of two bits can be used to generate one of the four possible phases for $\dot{A}_p$. Another maximal length sequence may be used to generate 15 bits. Each bit can generate one of two possible phases for □p. The two codes thusly generated are shown in the drawing of FIG. 5 herein.

Results

This section illustrates the significant benefit from using transform domain communication system waveform as an ultra-wideband radar waveform. More precisely, the transform domain communication system waveform increases the maximum unambiguous range while keeping good velocity estimation due to the orthogonality of pulses realized. As an would have to be reduced to one kilohertz which would decrease the maximum velocity estimate to 16.66 meters/second.

Ambiguity analysis further shows the advantages of a transform domain communication system waveform radar over a pseudo-noise pulse sequence radar. Such an ambiguity analysis may follow the development disclosed in reference 19 herein. Such an ambiguity analysis focuses on the Doppler and time cuts of the complex ambiguity function. The complex ambiguity function is defined in equation 7 below which may be obtained from reference 14.

$$\chi(\tau,f) = |\int_{-\infty}^{\infty} u(t-\tau)u^*(t)e^{j2\pi ft}dt|^2 \qquad (7)$$

Table 1 included above herein compares the results for an uncoded radar, a pseudo-noise pulse compression radar, and a transform domain communication system pulse compression radar. This table illustrates the advantages offered by a transform domain communication system waveform that traditional pulse compression codes cannot match. FIG. 6 herein shows an ambiguity surface diagram comparison for the pseudo-noise and transform domain communication system codes.

Figure 7:
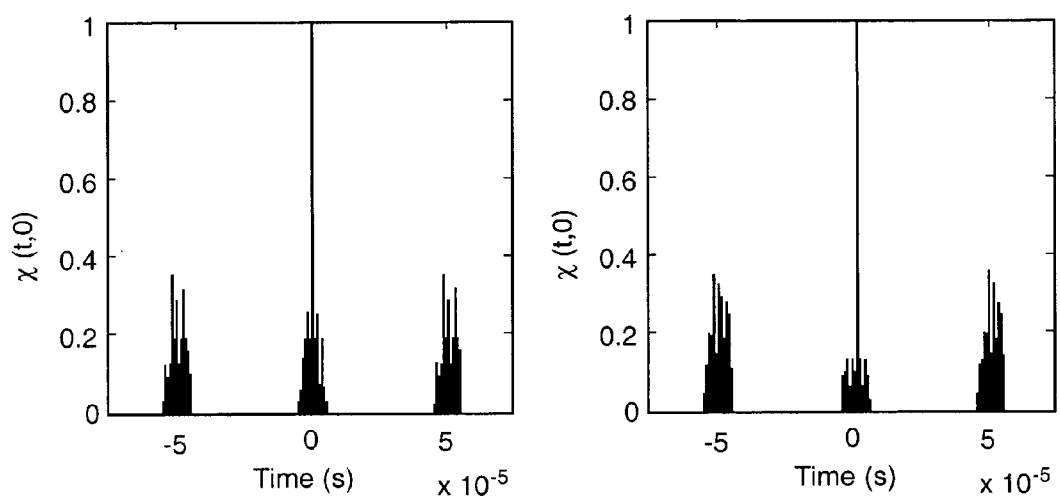
FIG. 7 shows a comparison of pseudo-noise and transform domain ambiguity time plots relevant to the present invention.
Figure 8:
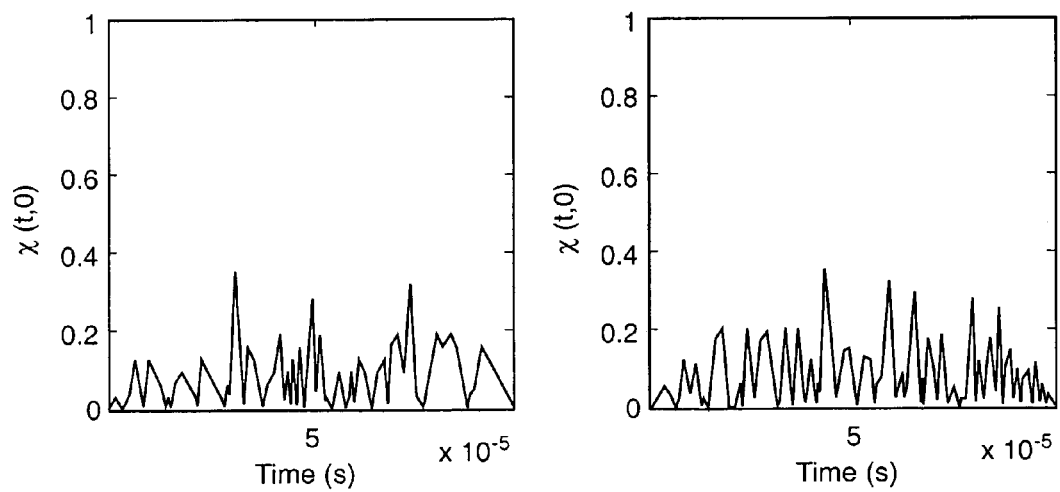
FIG. 8 shows a comparison of pseudo-noise and transform domain ambiguity time plots focused around a delay of one pulse repetition interval and relating to the present invention.

FIG. 7 in the drawings shows a comparison between the ambiguity diagram of pseudo-noise codes and transform domain communication system codes when there is no Doppler shift involved; this is illustrated by the lower sidebands appearing around the central point of correlation and demonstrates that the transform domain communication system code has better autocorrelation features than the PN sequence code. The amplitude of the ambiguity diagram between the symbols with the different codes is however similar in FIG. 7. FIG. 8 in the drawings shows that the ambiguity function diagram is near 0 when the two orthogonal transform domain communication system codes are synchronized versus a value of 0.25 to 0.3 for the PN codes.

Figure 9:
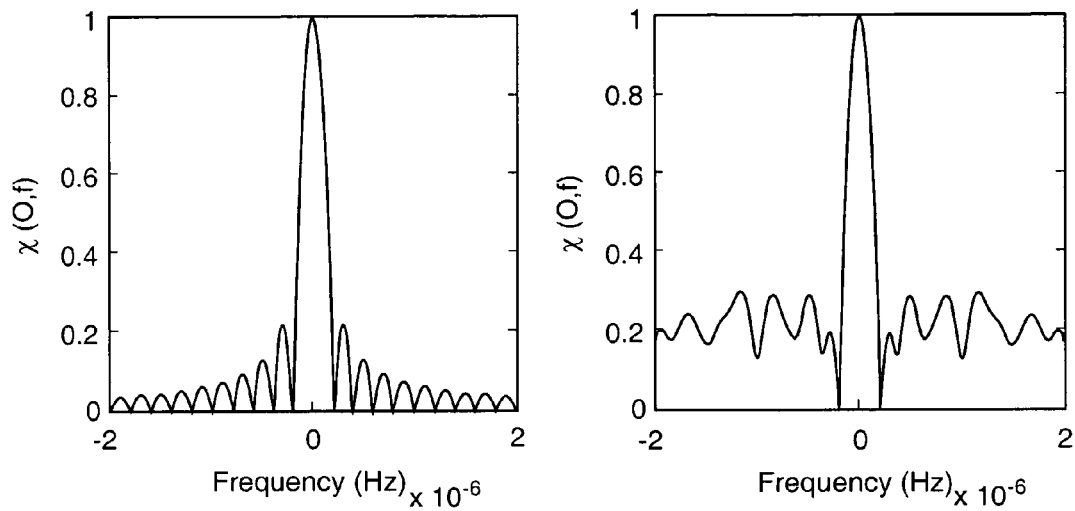
FIG. 9 shows a comparison of first pulse synchronized pseudo-noise and transform domain frequency cut plots relevant to the present invention.
Figure 10:
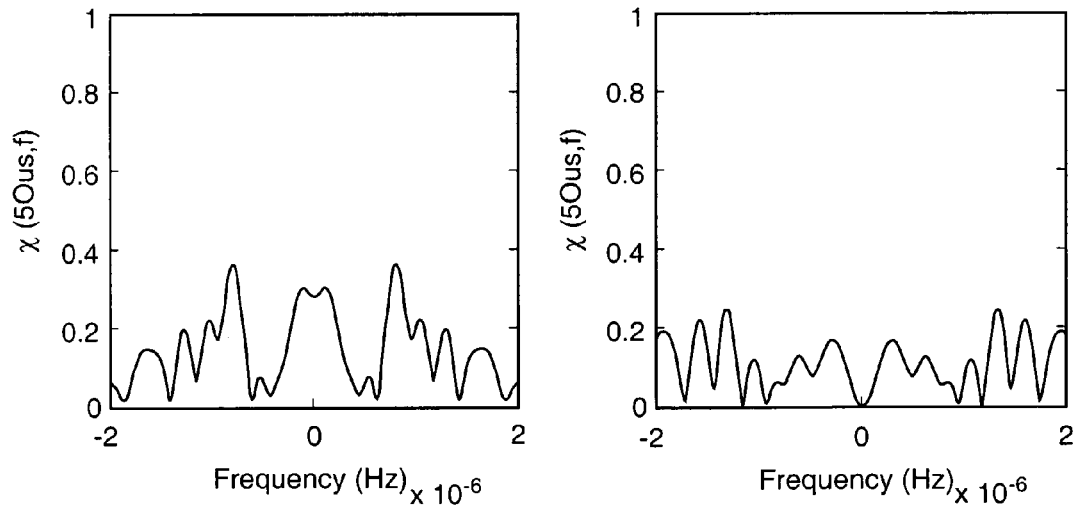
FIG. 10 shows a comparison of second pulse synchronized pseudo-noise and transform domain frequency cut plots relevant to the present invention.

FIG. 9 shows for synchronized pulses that the main lobes in Doppler for the pseudo-noise codes and transform domain communication system codes are similar, however, the pseudo-noise codes have better sidelobe performance. FIG. 10 shows the effect of Doppler when the radars are synchronized on the second pulse. Because of the orthogonality between present invention pulses, the transform domain communication system coding shows a dip in the ambiguity function which reduces all the way to zero when there is no Doppler shift present. This orthogonality shows the ability of transform domain communication system codes to increase the unambiguous range while keeping the pulse repetition frequency high. By keeping the pulse repetition frequency high, transform domain communication system radar coding can achieve simultaneous velocity and range estimation that traditional pulse compression radar techniques cannot. For the pseudo-noise sequences the ambiguity function has significant amplitude when the different pulses are synchronized and the Doppler shift is around zero.

Thus it may be appreciated that use of transform domain communication system coding in an ultra wideband radar offers significant system improvements. Specifically, these improvements in bandwidth, waveform diversity, and range ambiguity present an approach to achievement of simultaneous velocity and range estimations. Transform domain communication system coding presents the advantages given by pulse compression techniques with regards to bandwidth and the unambiguous range improvements often given by a lower pulse repetition frequency but at a higher pulse repetition frequency allowing better velocity estimation.

While the apparatus and method herein described constitute a preferred embodiment of the invention, it is to be understood that the invention is not limited to this precise form of apparatus or method and that changes may be made therein without departing from the scope of the invention which is defined in the appended claims.

REFERENCE APPENDIX

1. D. M. Boronson, "Sample size considerations in adaptive arrays," IEEE Transactions on Aerospace and Electronic Systems 16, No. 4, pp. 446-451, July 1980.
2. J. T. Caldwell and T. B. Hale, "Parametric adaptive matched filter applied to forward looking radar," in 2004 SEE International Radar Conference, October 2004.
3. J. T. Caldwell and T. B. Hale, "Space-time adaptive processing for forward looking arrays," in 2004 IEEE National Radar Conference, April 2004.
4. J. Ward, "Space-time adaptive processing for airborne radar," Contract F19628-95-C-0002, Lincoln Laboratory, Massachusetts Institute of Technology, Lexington, Mass., December 1994.
5. P. G. Richardson, "Space-time adaptive processing for manoeuvring airborne radar," IEE Transactions on Electronics and Communication 11, No. 1, pp. 57-63, February 1999.
6. J. R. Roman, M. Rangaswamy, D. W. Davis, Q. Zhang, B. Himed, and J. H. Michels, "Parametric adaptive matched filter for airborne radar applications," IEEE Transactions on Aerospace and Electronic Systems 36, No. 2, pp. 677-692, April 2000.
7. L. Brennan and F. Staudaher, "Subclutter visibility demonstration," Technical Report RL-TR-92-21, Adaptive Sensors Incorporated, March 1992.
8. A. Jaffer, M. Baker, W. Ballance, and J. Staub, "Adaptive space-time processing techniques for airborne radars", Contract F30602-89-D-0028, Hughes Aircraft Company, Fullerton, Calif. 92634, July 1991.
9. R. Klemm, Principles of Adaptive Space-Time Processing, IEE, London, 2002.
10. W. L. Melvin, "Nonhomogeneity detection for adaptive signal processing," in Proceedings of the 1996 IASTED International Conference on Signal and Image Processing, November 1996.
11. J. S. Goldstein and I. S. Reed, "A tutorial on space-time adaptive processing," in Proceedings of IEEE National Radar Conference, May 1997.
12. L. Brennan and I. Reed, "Theory of adaptive radar," IEEE Transactions on Aerospace and Electronic Systems AES-9, No. 2, pp. 237-252, March 1973.
13. R. L. Peterson, R. E. Ziemer, and D. E. Borth, Introduction to Spread Spectrum Communications, Prentice-Hall, Inc., Englewood Cliffs, N.J. 07632, 1995.
14. M. I. Skolnik, Introduction to Radar Systems, Second Edition, McGraw-Hill, Inc., New York, 1980.
15. R. Peterson, R. Ziemer, and D. Borth, Introduction to Spread-Spectrum Communications, Prentice-Hall, Englewood Cliffs, N.J., 1995.

We claim:

1. The method of operating an ultra-wideband transform domain pulse Doppler radar comprising the steps of:
    selecting unused spectral regions within an operating frequency band of said radar for present usage thereby;
    identifying a plurality of evenly spaced specific frequencies within each of said unused spectral regions;
    generating a radar transmitter output signal component at each of said evenly spaced identified unused specific frequencies;
    altering phase relationships between said specific frequency signals according to a predetermined phasing algorithm; and
    combining said phase altered specific frequency signals into a composite transmitter output signal of said radar.
2. The method of operating an ultra-wideband transform domain pulse Doppler radar of claim 1 wherein said predetermined phasing algorithm is of a pseudo random phasing nature and said composite transmitter output signal achieves a first blush noise characterized waveform appearance.
3. The method of operating an ultra-wideband transform domain pulse Doppler radar of claim 1 wherein said predetermined phasing algorithm generates an optimum composite transmitter output signal synchronized ambiguity time plot.
4. The method of operating an ultra-wideband transform domain pulse Doppler radar of claim 1 wherein said predetermined phasing algorithm generates an optimum synchronized composite transmitter output signal ambiguity frequency cut plot.
5. The method of operating an ultra-wideband transform domain pulse Doppler radar of claim 4 wherein said optimum synchronized composite transmitter output signal synchronized ambiguity frequency cut plot includes a central frequency correlation peak and minimal lesser sideband frequency correlation magnitudes.
6. The method of operating an ultra-wideband transform domain pulse Doppler radar of claim 1 wherein said composite transmitter output signal inclusive of phase altered specific frequency signals is also supplied to a receiver portion of said radar and used in a correlation recognition of a reflected radar return signal.

7. The method of operating an ultra-wideband transform domain pulse Doppler radar of claim 1 wherein said step of combining said phase altered specific frequency signals into a composite transmitter output signal of said radar includes performing an inverse Fourier transformation mathematical operation wherein frequency domain signals are converted into time domain signals.

8. The method of operating an ultra-wideband transform domain pulse Doppler radar of claim 1 wherein said predetermined phasing algorithm includes a plurality of specific phase relationships generating a plurality of distinguishable output signal adjacent sequential pulses in said combined composite transmitter output signals and wherein said distinguishable output signal adjacent sequential pulses achieve distinguishable sequential radar reflection return pulses to enable discrimination between adjacent sequential radar return pulses and extension of ambiguity free range characteristic in said radar.

9. The method of operating an ultra-wideband transform domain pulse Doppler radar of claim 1 wherein said step of selecting unused spectral regions within an operating frequency band of said radar for present usage includes excluding spectral region frequencies occupied by potentially interfering radio frequency signals of signal amplitude in excess of a selected signal threshold level.

10. Ultra-wideband pulse Doppler transform domain radar apparatus comprising the combination of:
   means for selecting unused spectral regions within an operating frequency band of said radar apparatus for present usage thereby;
   means for identifying a plurality of evenly spaced specific frequencies within each of said unused spectral regions;
   means for generating a radar apparatus transmitter output signal component at each of said identified specific frequencies;
   means for altering the phase relationship between said specific frequency signals according to a predetermined phasing algorithm; and
   means for combining said phase altered specific frequency signals into a composite transmitter output signal of said radar apparatus.

11. The ultra-wideband pulse Doppler transform domain radar apparatus of claim 10 wherein:
   said predetermined phasing algorithm includes a plurality of specific phase relationships generating a plurality of distinguishable output signal adjacent sequential pulses in said combined composite transmitter output signals; and
   said distinguishable output signal adjacent sequential pulses generate distinguishable sequential radar reflection return pulses and enable discrimination between adjacent sequential radar return pulses to enhance an ambiguity free range characteristic in said radar.

12. Doppler transform domain ultra-wideband pulse radar apparatus comprising the combination of:
   radio receiver apparatus identifying unused spectral regions within an operating frequency band of said radar apparatus for present radar signal component usage;
   signal sourcing apparatus generating a plurality of evenly spaced specific frequency radar apparatus output component signals within each of said unused spectral regions;
   phase modulation apparatus altering a phase relationship between said specific frequency signal components in response to a predetermined phasing algorithm; and
   signal combining apparatus including an inverse Fourier transformation mixer apparatus combining said phase altered specific frequency component signals into a composite transmitter output signal of said radar apparatus.

13. The Doppler transform domain ultra-wideband pulse radar apparatus of claim 12 wherein said phase modulation apparatus phasing algorithm includes first and second phase angle determining indicia generating orthogonally identified transmitter output signal pulses having adjacent reflected pulse identifiably in a stream of radar return pulses.

14. The Doppler transform domain ultra-wideband pulse radar apparatus of claim 12 wherein said composite transmitter output signal of said radar apparatus includes a plurality of transform domain communication system signal characteristics.

* * * * *